United States Patent
Lopez et al.

(10) Patent No.: US 9,085,370 B2
(45) Date of Patent: Jul. 21, 2015

(54) SYSTEMS AND METHODS FOR WIRELESS DATA TRANSFER DURING IN-FLIGHT REFUELING OF AN AIRCRAFT

(71) Applicant: General Electric Company, Schenectady, NY (US)

(72) Inventors: James Gerard Lopez, East Schodack, NY (US); Michael Joseph Dell'Anno, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 115 days.

(21) Appl. No.: 13/908,303

(22) Filed: Jun. 3, 2013

(65) Prior Publication Data

US 2014/0353429 A1 Dec. 4, 2014

(51) Int. Cl.
  B64D 39/00 (2006.01)
  H04B 1/3822 (2015.01)
  H04B 7/185 (2006.01)
  H04B 10/114 (2013.01)
  H04B 10/00 (2013.01)

(52) U.S. Cl.
  CPC .............. *B64D 39/00* (2013.01); *H04B 1/3822* (2013.01); *H04B 7/18506* (2013.01); *H04B 10/1143* (2013.01); *H04B 10/22* (2013.01)

(58) Field of Classification Search
  USPC ...................... 244/135 A, 135 B, 135 R, 1 TD
  See application file for complete search history.

(56) References Cited

U.S. PATENT DOCUMENTS

| | | | | |
|---|---|---|---|---|
| 5,384,697 A * | 1/1995 | Pascucci | ......................... | 700/10 |
| 5,575,438 A * | 11/1996 | McGonigle et al. | ............ | 244/13 |
| 5,906,336 A * | 5/1999 | Eckstein | .................... | 244/135 A |
| 7,798,449 B2 * | 9/2010 | Small et al. | ............... | 244/135 A |
| 7,980,512 B1 * | 7/2011 | Speer et al. | ............... | 244/135 A |
| 8,033,506 B2 * | 10/2011 | Greene | ....................... | 244/135 A |
| 8,047,471 B2 * | 11/2011 | Adarve Lozano | ........ | 244/135 A |
| 8,074,918 B1 * | 12/2011 | Monson et al. | ................. | 244/15 |
| 8,132,759 B2 * | 3/2012 | Von Thal | ................... | 244/135 A |
| 8,381,779 B1 * | 2/2013 | Wyler | .............................. | 141/94 |
| 2002/0060267 A1 * | 5/2002 | Yavnai | ......................... | 244/23 A |
| 2003/0146977 A1 * | 8/2003 | Vale et al. | .................. | 348/207.1 |
| 2004/0129865 A1 | 7/2004 | Doane | | |
| 2009/0112378 A1 * | 4/2009 | Robb et al. | ......................... | 701/3 |
| 2009/0154876 A1 * | 6/2009 | McLaughlin et al. | ........... | 385/36 |
| 2010/0001124 A1 | 1/2010 | Feldmann | | |
| 2010/0014082 A1 * | 1/2010 | Loecklin | ....................... | 356/328 |
| 2010/0193625 A1 * | 8/2010 | Sommer | ........................... | 244/2 |
| 2011/0301784 A1 * | 12/2011 | Oakley et al. | ...................... | 701/2 |
| 2012/0083945 A1 * | 4/2012 | Oakley et al. | ...................... | 701/2 |
| 2012/0168564 A1 | 7/2012 | Feldmann et al. | | |
| 2013/0225069 A1 * | 8/2013 | Bruce | ............................. | 455/40 |
| 2014/0042274 A1 * | 2/2014 | Hatcher et al. | ............. | 244/135 A |
| 2014/0138473 A1 * | 5/2014 | Yu | .................................. | 244/3.16 |
| 2014/0158829 A1 * | 6/2014 | Gimenez Abad | ......... | 244/135 A |
| 2014/0183300 A1 * | 7/2014 | MacCulloch et al. | ....... | 244/1 TD |
| 2014/0203147 A1 * | 7/2014 | Barsheshet et al. | ........ | 244/135 A |

* cited by examiner

*Primary Examiner* — Christopher P Ellis
*Assistant Examiner* — Medhat Badawi
(74) *Attorney, Agent, or Firm* — John P. Darling (57) ABSTRACT

A refueling drogue assembly includes a drogue body coupled to a tanker aircraft, and at least one data transmission device coupled to the drogue body. The at least one data transmission device is configured to receive a transmission signal from a partner transmission device coupled to an airborne target aircraft. The transmission signal includes data to be stored. The drogue assembly further includes a data storage device coupled to the tanker aircraft. The data storage device is communicatively coupled to the at least one data transmission device. The data storage device is configured to receive the transmission signal and store the data.

19 Claims, 4 Drawing Sheets

SYSTEMS AND METHODS FOR WIRELESS DATA TRANSFER DURING IN-FLIGHT REFUELING OF AN AIRCRAFT

BACKGROUND

The present technology relates generally to aircraft refueling systems and, more specifically, to systems and methods for wirelessly transferring data between an aircraft and a refueling aircraft during an airborne refueling operation.

Unmanned aerial vehicles (UAVs) may store data associated with aerial reconnaissance missions conducted during the course of operation. Onboard storage may become exhausted during a mission due to the storage size requirements of high resolution images and video, as well as the limitations of onboard storage space. Some systems for offloading data from the UAV's onboard storage require the aircraft to return to an airfield and land. This takes the UAV off location and out of service for a period of time.

UAV's may participate in aerial, or "in-flight", refueling, which is the process of transferring fuel from one aircraft to another while airborne. In-flight refueling operations involve a fuel source aircraft, i.e., a tanker, and a target aircraft, i.e., a receiver. During flight, the tanker aircraft connects to the receiver aircraft and transfers fuel. Some systems utilize a "probe-and-drogue" system for connecting the two aircraft. The tanker aircraft establishes a position in front and above the receiver aircraft, and extends a hose out into the air behind the tanker. The hose is terminated by a drogue, which is shaped to assist connecting with the receiver aircraft. The receiver aircraft has a probe extending from its surface. The probe and drogue are configured to couple together, thereby allowing fuel to flow through the hose, through the probe, and into the fuel storage system of the receiver aircraft.

In-flight refueling allows a receiver aircraft to stay airborne longer than otherwise allowed by the limitations of its fuel tank. However, a UAV has not only fuel capacity limitations, but has data storage capacity limitations as well. What is needed is a system and method for transferring data off of the UAV while refueling the UAV during flight.

BRIEF DESCRIPTION

In one aspect, a refueling drogue assembly is provided. The drogue assembly includes a drogue body coupled to a tanker aircraft. The drogue assembly also includes at least one data transmission device coupled to the drogue body. The at least one data transmission device is configured to receive a transmission signal from a partner transmission device coupled to an airborne target aircraft. The transmission signal includes data to be stored. The drogue assembly further includes a data storage device coupled to the tanker aircraft. The data storage device is communicatively coupled to the at least one data transmission device. The data storage device is configured to receive the transmission signal and store the data.

In another aspect, an airborne refueling system is provided. The refueling system includes a first data storage device coupled to a first airborne aircraft. The refueling system also includes a first data transmission device coupled to the first airborne aircraft. The first data transmission device is communicatively coupled to the first data storage device. The first data transmission device is configured to transmit data from the first data storage device. The refueling system further includes a drogue assembly coupled to a second airborne aircraft. The drogue assembly includes a second data transmission device coupled to the drogue assembly. The second data transmission device is configured to receive a transmission signal from the first data transmission device. The transmission signal includes the data. The drogue assembly also includes a second data storage device coupled to the drogue assembly. The second data storage device is configured to receive the transmission signal from the second data transmission device and store the data.

In yet another aspect, a method of wirelessly transmitting data between a first airborne aircraft and a second airborne aircraft is provided. The first airborne aircraft includes a first data storage device and a first data transmission device. The second airborne aircraft includes a drogue assembly coupled to the first airborne aircraft. The drogue assembly includes a second data storage device and a second data transmission device. The method includes transmitting data from the first data storage device to the first data transmission device. The method also includes transmitting a transmission signal from the first data transmission device. The transmission signal includes the data. The method further includes receiving the transmission signal by the second data transmission device. The method also includes transmitting the data from the second data transmission device to the second data storage device. The method further includes storing the data on the second data storage device. The second data storage device is coupled to the drogue assembly.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital media, with the sole exception being a transitory, propagating signal.

Reconnaissance aircraft, such as unmanned aerial vehicles, may exhaust their onboard storage while capturing data. The exemplary systems and methods described herein provide a way to offload data from an airborne aircraft wirelessly during refueling operations. More specifically, during an in-flight refueling operation, a receiver aircraft couples to a tanker aircraft through a drogue trailed behind the tanker aircraft. The receiver aircraft transmits data from its storage device to a data transmission device. The data transmission device transmits a transmission signal wirelessly to a second data transmission device coupled to the drogue assembly of the tanker aircraft. The drogue assembly transmission device transmits the data through to another data storage device also coupled to the drogue assembly. Thus, data is offloaded from the receiver aircraft during the refueling operation, allowing the receiver aircraft to continue gathering new data.

The systems and methods discussed herein refer, in the example embodiments, to a probe and drogue aerial refueling configuration. However, other embodiments are possible without deviating from this disclosure. For example, the systems and methods described herein may also be applicable in other aerial refueling configurations, such as "boom and receptacle", or "flying boom", which generally provides a rigid, telescoping tube in the place of the hose and drogue elements. Alternatively, any other aerial refueling configuration that enables operation of the systems and methods as described herein may be used.

Figure 1:
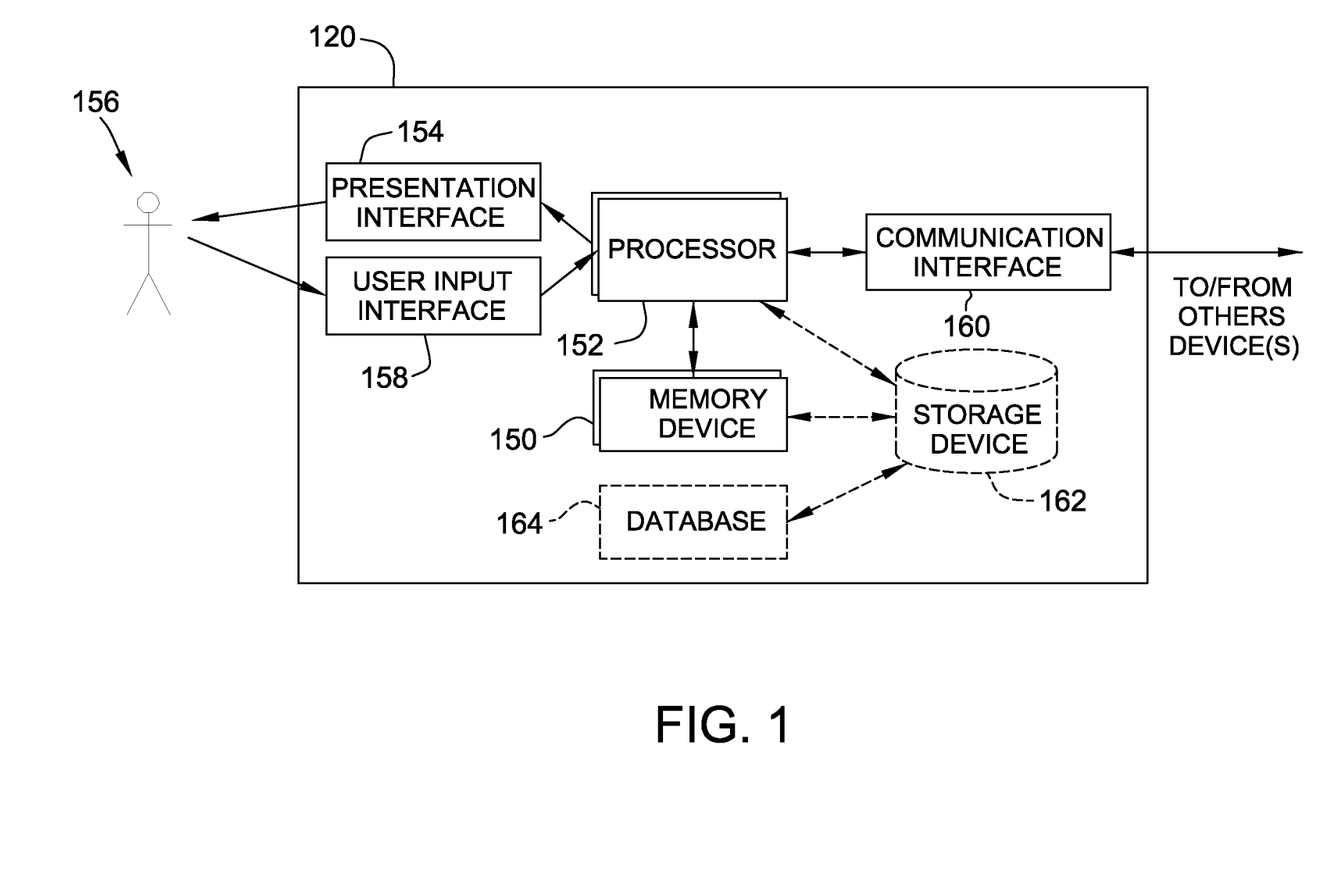
FIG. 1 is a block diagram of an exemplary computing system that may be used to store aerial reconnaissance data on tanker aircraft and receiver aircraft.

FIG. 1 is a block diagram of an exemplary computing system 120 that may be used to store aerial reconnaissance data on tanker aircraft and receiver aircraft. While computing system 120 shows many computing components, it should be understood that not all components shown may appear on either the receiver aircraft or the drogue assembly. Any computer architecture that enables operation of the systems and methods as described herein may be used.

In the exemplary embodiment, computing system 120 includes a memory device 150 and a processor 152 operatively coupled to memory device 150 for executing instructions. In some embodiments, executable instructions are stored in memory device 150. Computing system 120 is configurable to perform one or more operations described herein by programming processor 152. For example, processor 152 may be programmed by encoding an operation as one or more executable instructions and providing the executable instructions in memory device 150. Processor 152 may include one or more processing units, e.g., without limitation, in a multi-core configuration.

In the exemplary embodiment, memory device 150 is one or more devices that enable storage and retrieval of information such as executable instructions and/or other data. Memory device 150 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program. Memory device 150 may be configured to store information associated with and aerial reconnaissance mission.

In some embodiments, computing system 120 includes a presentation interface 154 coupled to processor 152. Presentation interface 154 presents information, such as a user interface and/or an alarm, to a user 156. For example, presentation interface 154 may include a display adapter (not shown) that may be coupled to a display device (not shown), such as a cathode ray tube (CRT), a liquid crystal display (LCD), an organic LED (OLED) display, and/or a hand-held device with a display. In some embodiments, presentation interface 154 includes one or more display devices. In addition, or alternatively, presentation interface 154 may include an audio output device (not shown) (e.g., an audio adapter and/or a speaker).

In some embodiments, computing system 120 includes a user input interface 158. In the exemplary embodiment, user input interface 158 is coupled to processor 152 and receives input from user 156. User input interface 158 may include, for example, a keyboard, a pointing device, a mouse, a stylus, and/or a touch sensitive panel (e.g., a touch pad or a touch screen). A single component, such as a touch screen, may function as both a display device of presentation interface 154 and user input interface 158.

Further, a communication interface 160 is coupled to processor 152 and is configured to be coupled in communication with one or more other devices, such as, without limitation, another computing system 120, and any device capable of accessing computing system 120 including, without limitation, a portable laptop computer, a personal digital assistant (PDA), and a smart phone. Communication interface 160 may include, without limitation, a wired network adapter, a wireless network adapter, a mobile telecommunications adapter, a serial communication adapter, and/or a parallel communication adapter. Communication interface 160 may receive data from and/or transmit data to one or more remote devices. For example, communication interface 160 of one computing system 120 may transmit transaction information to communication interface 160 of another computing system 120. Computing system 120 may be web-enabled for remote communications, for example, with a remote desktop computer (not shown).

Also, presentation interface 154 and/or communication interface 160 are both capable of providing information suitable for use with the methods described herein (e.g., to user 156 or another device). Accordingly, presentation interface 154 and communication interface 160 may be referred to as output devices. Similarly, user input interface 158 and communication interface 160 are capable of receiving information suitable for use with the methods described herein and may be referred to as input devices.

Processor 152 and/or memory device 150 may also be operatively coupled to a storage device 162. Storage device 162 is any computer-operated hardware suitable for storing and/or retrieving data, such as, but not limited to, data associated with a database 164. In the exemplary embodiment, storage device 162 is integrated in computing system 120. For example, computing system 120 may include one or more hard disk drives as storage device 162. Moreover, for example, storage device 162 may include multiple storage units such as hard disks and/or solid state disks in a redundant array of inexpensive disks (RAID) configuration. Storage device 162 may include a storage area network (SAN), a network attached storage (NAS) system, and/or cloud-based storage. Alternatively, storage device 162 is external to computing system 120 and may be accessed by a storage interface (not shown). Moreover, in the exemplary embodiment, database 164 contains a variety of static and dynamic data associated with, without limitation, aerial reconnaissance.

Figure 2:
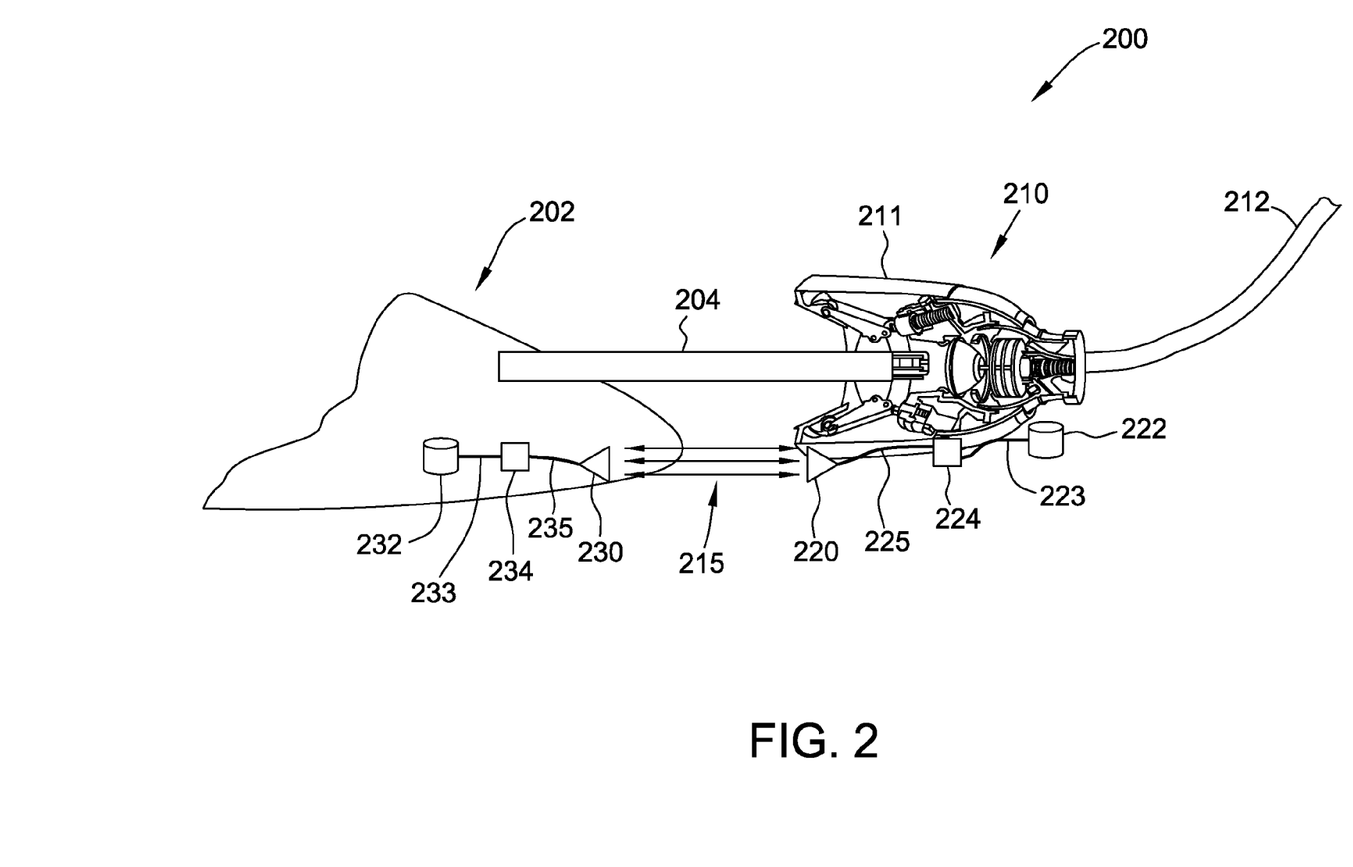
FIG. 2 is a schematic of an exemplary probe-and-drogue assembly shown in a coupled configuration, which includes a plurality of computing systems shown in FIG. 1 for wireless data transfer between an aircraft and a drogue.

FIG. 2 is a schematic of an exemplary probe-and-drogue assembly 200 shown in a coupled configuration, which includes a plurality of computing systems 120 (shown in FIG. 1) for wireless data transfer between an aircraft and a drogue. Probe-and-drogue assembly 200 includes a receiver aircraft 202 and a drogue assembly 210. In the example embodiment, receiver aircraft 202 includes a probe 204 extending beyond a forward-facing surface of the aircraft. Probe 204 couples to drogue assembly 210 during in-flight refueling and data-offloading operations.

Referring to the receiver aircraft, in the example embodiment, receiver aircraft 202 also includes a data transmission device 230, an electrical-to-optical converter 234, and a data storage device 232. Data storage device 232 is communicatively coupled to electrical-to-optical converter 234 through an electrical connection 233. Electrical connection 233 is an electrical signal-bearing medium such as, for example, a single-strand copper cable, or a twisted-pair Ethernet cable. Electrical-to-optical converter 234 is communicatively coupled to data transmission device 230 through an optical connection 235. Optical connection 235 is a light signal-bearing medium such as, for example, a fiber-optic cable. In other embodiments, data transmission device 230 is communicatively coupled to data storage device 232 directly through electrical connection 233, i.e., without the need of an electrical-to-optical converter 234.

In the example embodiment, data transmission device 230 is an optical dispersive device. Data transmission device 230 is, for example and without limitation, a graded-index lense, such as those commercially available from Thorlabs Inc. of Newton, N.J., U.S. Alternatively, any optical dispersive device that enables the systems and methods as described herein may be used. In other embodiments, data transmission device 230 is a radio frequency (RF) transmission device or an acoustic transmission device.

Data storage device 232 is configured to receive, store, and transmit data. More specifically, in the example embodiment, data storage device 232 is configured to receive, store, and transmit data associated with aerial reconnaissance. In some embodiments, data storage device 232 is computing system 120. Alternatively, any storage device that enables operation of the systems and methods as described herein may be used.

Also, in the example embodiment, electrical-to-optical converter 234 converts an electrical signal to an optical signal. More specifically, electrical-to-optical converter 234 converts an electrical signal received on electrical connection 233 to an optical signal, and transmits that optical signal on optical connection 235. In some embodiments, electrical-to-optical converter 234 is a light emitting diode (LED). In other embodiments, electrical-to-optical converter 234 is a laser. Alternatively, any electrical-to-optical converter that enables operations of the systems and methods as described herein may be used. Further, in some embodiments, electrical-to-optical converter 234 is an integrated component of data storage device 232. For example, data storage device 232 is computing system 120, which includes an electrical-to-optical converter 234 as a part of communications interface 160.

In the example embodiment, data transmission device 230 emits data-carrying light waves that transit across a signal pathway 215 in the open air. More specifically, data transmission device 230 receives an optical signal across optical connection 235 and transmits data-carrying light waves across signal pathway 215 directed toward an area near the forward-facing end of probe 204, where drogue assembly 210 couples to probe 204. In other embodiments, acoustic signals or radio frequency signals are transmitted by data transmission device 230 across signal pathway 215.

Referring to the drogue assembly, in the example embodiment, drogue assembly 210 also includes a drogue body 211. Coupled to drogue body 211 is a fuel hose 212, a data transmission device 220, an optical-to-electrical converter 224, and a data storage device 222. In the example embodiment, data transmission device 220 is an optical dispersive device similar to data transmission device 230, and receives data-carrying light waves from signal pathway 215. More specifically, data transmission device 220 receives an optical signal pathway 215 and transmits the optical signal across optical connection 225 to optical-to-electrical converter 224. In some embodiments, data transmission device 220 is a graded-index lense, such as those commercially available from Thorlabs Inc. of Newton, N.J., U.S. Alternatively, any optical dispersive device that enables the systems and methods as described herein may be used. In other embodiments, data transmission device 220 is an RF transmission device or an acoustic transmission device. Further, in some embodiments, data storage device 222 and/or optical-to-electrical converter 224 resides within the body of the tanker aircraft. As such, optical connection 225 and/or electrical connection 223 may extend from drogue body 210, up along hose 212, to the body of the tanker aircraft.

Also, in the example embodiment, optical-to-electrical converter 224 converts an optical signal to an electrical signal. More specifically, optical-to-electrical converter 224 receives an optical signal on optical connection 225, converts the signal to an electrical signal, and transmits that electrical signal on electrical connection 223 to data storage device 222. In some embodiments, optical-to-electrical converter 224 is a photodiode. Alternatively, any optical-to-electrical converter that enables operations of the systems and methods as described herein may be used. Further, in some embodiments, optical-to-electrical converter 224 is an integrated component of data storage device 222. For example, data storage device 222 may be computing system 120, which may include an optical-to-electrical converter 224 as a part of communications interface 160. In other embodiments, data transmission device 220 is communicatively coupled to data storage device 222 directly through electrical connection 223, i.e., without the need of an optical-to-electrical converter 224.

In the exemplary embodiment, optical-to-electrical converter 224 is communicatively coupled to data storage device 222 through an electrical connection 223. Electrical connection 223 is an electrical signal-bearing medium such as, for example, a single-strand copper cable, or a twisted-pair Ethernet cable. Data storage device 222 is configured to receive, store, and transmit data. More specifically, in the example embodiment, data storage device 222 is configured to receive, store, and transmit data associated with aerial reconnaissance. In some embodiments, data storage device 222 is computing system 120. Alternatively, any storage device that enables operation of the systems and methods as described herein may be used.

During operation, in the example embodiment, receiver aircraft 202 is an aircraft in flight and containing aerial reconnaissance data needing to be offloaded. Receiver aircraft 202 meets in flight with a tanker aircraft (not shown). The tanker aircraft extends drogue assembly 210 and fuel hose 212 behind the tanker. Receiver aircraft 202 couples with drogue assembly 210 by maneuvering probe 204 to connect with drogue body 211. While drogue assembly 210 is in proximity with receiver aircraft 202, such as while in a coupled configuration during refueling, data from data storage device 232 is transferred.

More specifically, data is transferred from data storage device 232 across electrical connection 233 to electrical-to-optical converter 234 in the form of an electrical signal. Electrical-to-optical converter 234 receives the electrical signal, converts the electrical signal to an optical signal, and transmits the optical signal across the optical connection 235 to data transmission device 230. Data transmission device 230 receives the optical signal and transmits the data as data-carrying light waves across signal pathway 215 to drogue assembly 210.

Drogue assembly 210 receives the data from the data-carrying light waves through data transmission device 220. Data transmission device 220 transmits the data as an optical signal through optical connection 225 to optical-to-electrical converter 224. Optical-to-electrical converter 224 converts the optical signal to an electrical signal and transmits the electrical signal across electrical connection 223 to data storage device 222. Data storage device 222 receives the data through the electrical signal and stores the data.

In some embodiments, drogue assembly 210 includes a plurality of data transmission devices 220. The plurality of data transmission device 220 may be oriented around drogue body 211, and may be circumferentially aligned about a central axis of drogue body 211. In operation, drogue assembly 210 may couple to probe 204 through 360 degrees of rotation such that use of a single data transmission device 220 may not orient in a suitable configuration through all 360 degrees. Use of a plurality of data transmission devices 220 may facilitate greater reception of data-carrying light waves.

In some embodiments, drogue assembly 210 is enabled to transmit data back to receiver aircraft 202. Drogue assembly 210 includes an electrical-to-optical converter similar to electrical-to-optical converter 234. Further, receiver aircraft 202 may include an optical-to-electrical converter similar to optical-to-electrical converter 224. Additional signal pathways for electrical and optical signals, such as electrical connections 223 and 233 and optical connections 225 and 235 may also be included. Further, some embodiments include at least one communications module (not shown) on receiver aircraft 202 and/or drogue assembly 210 and communicatively coupled to data storage devices 222 and 232, and/or data transmission devices 220 and 230. In one embodiment, the communications modules are configured to implement a communications protocol in the transmission of the electrical and/or optical signals discussed herein. The communications protocol provides data communications services such as, for example and without limitation, signaling, authentication, and/or error detection and correction, and also includes a command function such that data transmission may be initiated based on a command within the communications protocol. For example, drogue assembly 210 may communicate a data transfer initiation command to data storage device 232 after coupling with probe 204. Additionally, data may be transferred from the drogue assembly 210 to the receiver aircraft 202. For example, data related to command, control, security keys, and/or mission planning may be downloaded to the UAV during refueling.

Figure 3:
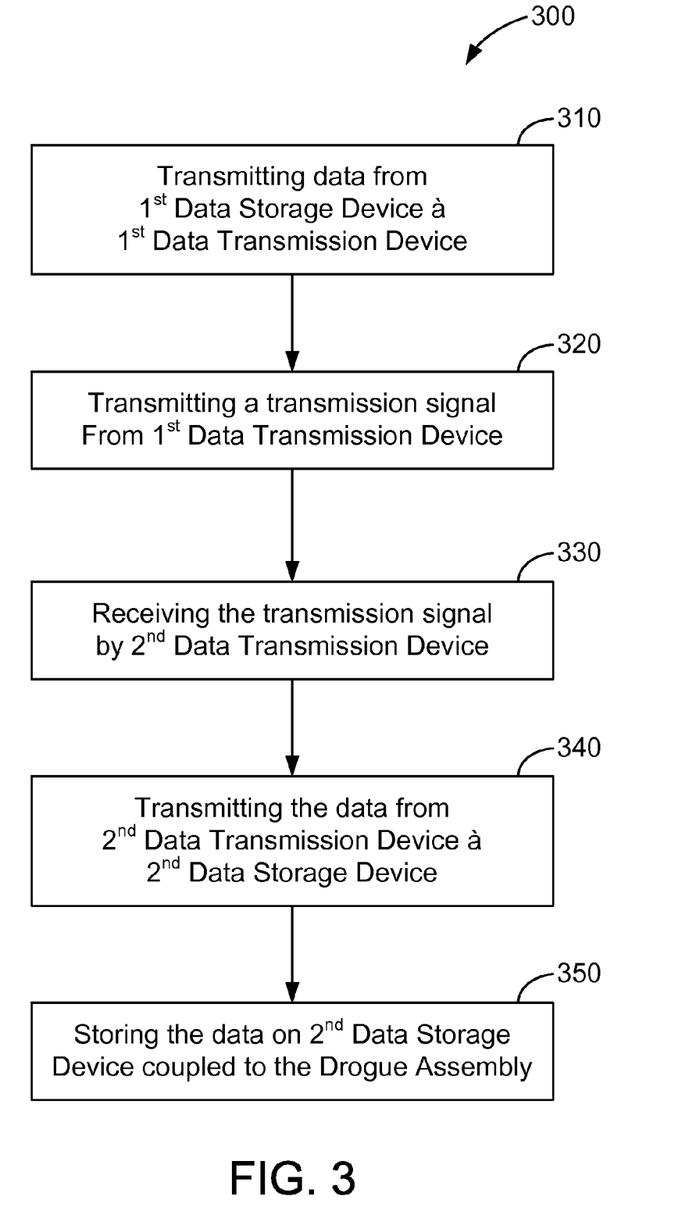
FIG. 3 is a flow chart of an exemplary method of transferring data between the aircraft and the drogue assembly shown in FIG. 2 using the computing systems shown in FIG. 1.

FIG. 3 is a flow chart of an exemplary method 300 of transferring data between aircraft 202 (shown in FIG. 2) and drogue assembly 210 (shown in FIG. 2) using computing systems 120 (shown in FIG. 1). In method 300, data is transmitted 310 from a first data storage device, such as data storage device 232 (shown in FIG. 1) to a first data transmission device, such as data transmission device 230 (shown in FIG. 2). In some embodiments, transmitting 310 includes converting the transmission signal from an electrical signal to an optical signal using a device such as electrical-to-optical converter 233 (shown in FIG. 1).

Also, in the exemplary embodiment, method 300 includes transmitting 320 a transmission signal from the first data transmission device. The transmission signal includes the data. In some embodiments, transmitting 320 the transmission signal is performed by an optical dispersive device, such as data transmission device 230. In other embodiments, the transmission signal is similar to data-carrying light waves across signal pathway 215 (shown in FIG. 2). In the exemplary embodiment, the first data storage device, the first data transmission device, and the electrical-to-optical converter are each coupled to an airborne receiver aircraft.

Further, in the exemplary embodiment, method 300 includes receiving 330 the transmission signal by a second data transmission device. In some embodiments, the second data transmission device is an optical dispersive device, such as data transmission device 220 (shown in FIG. 2).

Moreover, in the exemplary embodiment, method 300 includes transmitting 340 the data from the second data transmission device to a second data storage device. In some embodiments, the second data storage device is similar to data storage device 222. In other embodiments, transmitting 310 includes converting the transmission signal from an optical signal to an electrical signal using a device such as optical-to-electrical converter 223 (shown in FIG. 1). The second data storage device then stores 350 the data. In the exemplary embodiment, the second data storage device, the second data transmission device, and the optical-to-electrical converter are each coupled to a drogue assembly of an airborne refueling aircraft.

Figure 4:
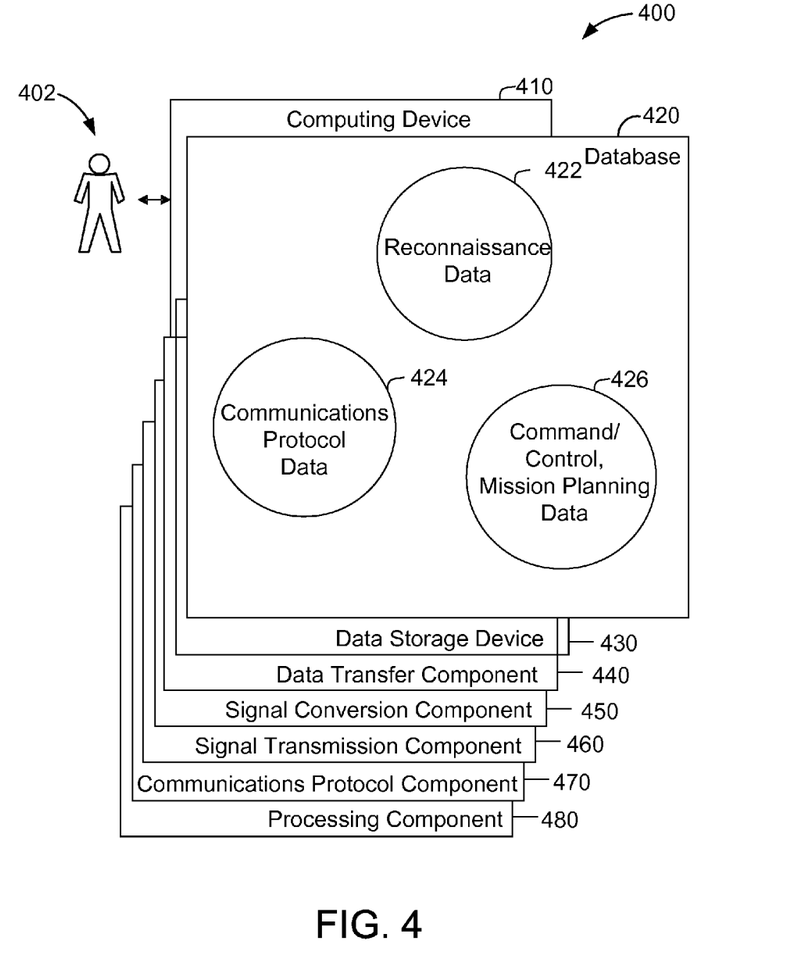
FIG. 4 shows an example configuration of a database within a computing device, along with other related computing components, that may be used during data transfer operations.

FIG. 4 shows an example configuration 400 of a database 420 within a computing device 410, along with other related computing components, that may be used during data transfer operations. Database 420 is coupled to several separate components within computing device 410, which perform specific tasks.

In the exemplary embodiment, database 420 includes reconnaissance data 422, communications protocol data 424, and command/control data 426. Reconnaissance data 422 includes data gathered during operation of aircraft 202 (shown in FIG. 2), such as, for example, reconnaissance data gathered by a UAV during surveillance operations. Communications protocol data 424 includes information on the communications operations between various computing devices such as between drogue assembly 210 and aircraft 202. Command/control data 426 includes information that may be transferred from drogue assembly 210 to aircraft 202, such as command and control data, or mission planning data.

Computing device 410 includes the database 420, as well as data storage devices 430. Computing device 410 also includes a data transfer component 440 for transferring data into and/or out of database 420, a signal conversion component 450 for converting signals between electrical and optical mediums, a signal transmission component 460 for transmitting wireless signals, and a communications protocol component 470 for facilitating data transfer operations. A processing component 480 assists with execution of computer-executable instructions associated with the data transfer operations.

The embodiments illustrated and described herein, as well as embodiments not specifically described herein, but, within the scope of aspects of the disclosure, constitute exemplary means for transferring data wirelessly between a receiver aircraft and a drogue attached to a tanker aircraft during flight. For example, computing system 120, and any other similar computer device added thereto or included within, when integrated together, include sufficient computer-readable storage media that is/are programmed with sufficient computer-executable instructions to execute processes and techniques with a processor as described herein. Specifically, computing system 120 and any other similar computer device added thereto or included within, when integrated together, constitute an exemplary means for transferring data wirelessly between two airborne aircraft during refueling operations.

The above-described systems and methods provide a way to wirelessly transfer data between an airborne aircraft and a drogue during refueling operations. Reconnaissance aircraft, such as unmanned aerial vehicles, may exhaust their onboard storage while capturing data. The embodiments described herein allow for the reconnaissance aircraft to offload its data to a nearby tanker aircraft during the normal refueling operations. The data transfer during a refueling operation allows the aircraft to stay airborne and on location, eliminating the need to return and land at an airfield, thereby allowing greater service time with less interruptions. Equipping the tanker aircraft with a drogue assembly having wireless communications and storage capability allows for short-range wireless communications, which provides security in data transmission based on the limits of signal range. Having the storage housed on the drogue assembly rather than, for example, up in the tanker aircraft itself, eliminates an electric-conducting wire travelling up the length of the hose.

An exemplary technical effect of the methods, systems, and apparatus described herein includes at least one of: (a) vacating storage space on the receiver aircraft's data storage devices; (b) allowing more reconnaissance data to be gathered; (c) allowing the receiver aircraft to remain in flight and at or near the operational area; (d) increasing effective service times of receiver aircraft; (e) coupling data offload hardware with existing refueling infrastructure; and (f) coupling data offload operations with existing refueling operational requirements.

Exemplary embodiments of systems and methods for transmitting data from an airborne aircraft to a refueling drogue are described above in detail. The systems and methods described herein are not limited to the specific embodiments described herein, but rather, components of systems and/or steps of the methods may be utilized independently and separately from other components and/or steps described herein. For example, the methods may also be used in combination with other systems involving refueling systems and methods, and are not limited to practice with only the refueling system and methods as described herein. Rather, the exemplary embodiments can be implemented and utilized in connection with many other refueling and/or data transfer applications.

Although specific features of various embodiments may be shown in some drawings and not in others, this is for convenience only. In accordance with the principles of the systems and methods described herein, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A refueling drogue assembly comprising:
   a drogue body;
   at least one data transceiver coupled to said drogue body and configured to receive a transmission signal from a partner transceiver coupled to an airborne receiver aircraft, the transmission signal including data to be stored; and
   a data storage device coupled to the drogue body and communicatively coupled to said at least one data transceiver, said data storage device configured to receive the transmission signal and store the data, wherein the data includes aerial reconnaissance data, communications protocol, mission planning data, and command and control data.

2. The drogue assembly in accordance with claim 1, wherein said at least one data transceiver comprises an optical dispersive device, and the transmission signal includes an optical signal.

3. The drogue assembly in accordance with claim 2 further comprising an optical-to-electrical converter communicatively coupled to said at least one data transceiver and to said data storage device, said optical-to-electrical converter configured to convert the transmission signal from an optical signal to an electrical signal, wherein said optical-to-electrical converter comprises a photo diode.

4. The drogue assembly in accordance with claim 1, wherein said at least one data transceiver comprises one of a radio frequency transceiver and an acoustic transceiver.

5. The drogue assembly in accordance with claim 1, wherein said at least one data transceiver comprises a plurality of data transceivers, each data transceiver of said plurality of data transceivers is communicatively coupled to said data storage device and configured to receive the transmission signal from the partner transceiver.

6. The drogue assembly in accordance with claim 5, wherein said plurality of data transceivers is substantially concentrically aligned about a center axis of said drogue body.

7. The drogue assembly in accordance with claim 1 further comprising a communications module communicatively coupled to said at least one data transceiver and to said data storage device, said communications module configured to implement a communications protocol in the transmission signal for communication with the airborne target aircraft, wherein said communications protocol is configured to initiate a transmission of at least some of the data.

8. An airborne refueling system comprising:
a first data storage device coupled to a first airborne aircraft;
a first data transceiver coupled to the first airborne aircraft and communicatively coupled to said first data storage device, said first data transceiver configured to transmit data from said first data storage device, wherein the data includes aerial reconnaissance data, communications protocol, mission planning data, and command and control data;
a drogue assembly coupled to a second airborne aircraft;
a second data transceiver coupled to said drogue assembly and configured to receive a transmission signal from said first data transceiver, wherein the transmission signal includes the data; and
a second data storage device coupled to said second airborne aircraft and configured to receive the transmission signal from said second data transceiver and store the data.

9. The airborne refueling system in accordance with claim 8, wherein said second data storage device is coupled to said drogue assembly, said first data transceiver comprises a first optical dispersive device, said second data transceiver comprises a second optical dispersive device, and the transmission signal includes an optical signal.

10. The airborne refueling system in accordance with claim 9 further comprising:
a first electrical-to-optical converter coupled to the first airborne aircraft; and
a first optical-to-electrical converter coupled to said drogue assembly.

11. The airborne refueling system in accordance with claim 10 further comprising:
a second optical-to-electrical converter coupled to the first airborne aircraft and comprising a photo diode; and
a second electrical-to-optical converter coupled to said drogue assembly and comprising one of a light mining diode and a laser.

12. The airborne refueling system in accordance with claim 8 further comprising a plurality of data transceivers, each data transceiver of said plurality of data transceivers coupled to said drogue assembly and configured to receive the transmission signal from said first transceiver.

13. The airborne refueling system in accordance with claim 8 further comprising a first communications module coupled to the first airborne aircraft and a second communications module coupled to said drogue assembly, wherein said first and second communications modules are configured to implement a communications protocol in the transmission signal.

14. A method of wirelessly transmitting data between a first airborne aircraft and a second airborne aircraft, wherein the first airborne aircraft includes a first data storage device and a first data transceiver, the second airborne aircraft includes a drogue assembly coupled to the first airborne aircraft, the drogue assembly including a second data storage device and a second data transceiver, said method comprising:
transmitting data from the first data storage device to the first data transceiver, wherein the data includes aerial reconnaissance data, communications protocol, mission planning data, and command and control data;
transmitting a transmission signal from the first data transceiver, wherein the transmission signal includes the data;
receiving the transmission signal by the second data transceiver;
transmitting the data from the second data transceiver to the second data storage device; and
storing the data on the second data storage device, wherein the second data storage device is coupled to the drogue assembly.

15. The method in accordance with claim 14 further comprising:
coupling the drogue assembly to the first airborne aircraft; and
initiating transmission of the data from the first data storage device to the first data transceiver upon completion of said coupling.

16. The method in accordance with claim 15, wherein initiating transmission of the data from the first data storage device to the first transceiver comprises sending, by the first data storage device, an initiation instruction to the second data transceiver.

17. The method in accordance with claim 14 further comprising deleting the data on the first data storage device, wherein deleting the data comprises receiving an acknowledgement of successful transmission from the second data storage device prior to deleting.

18. The method in accordance with claim 14 further comprising:
converting the transmission signal from an electrical signal to an optical signal by a first electrical-to-optical converter communicatively coupled to the first data transceiver and the first data storage device; and
converting, the transmission signal from an optical signal to an electrical signal by a second optical-to-electrical converter communicatively coupled to the second data transceiver and the second data storage device.

19. The method in accordance with claim 14 further comprising:
transmitting a second transmission signal from the second data transceiver, wherein the second transmission signal includes a second data; and
receiving the second transmission signal by the first data transceiver.

* * * * *